United States Patent Office 3,383,761

Patented May 21, 1968

3,383,761
PROCESS OF PRODUCING MAGNETIC MEMORY ELEMENTS

Toshio Hayasaka, Kenro Masuzawa, and Yuzo Odani Tokyo, Shigeo Senzaki, Yokohama, and Yuji Gomi, Tadamasa Ogawa, and Keizo Fujisawa, Tokyo, Japan, assignors to Nippon Telegraph & Telephone Public Corporation, Tokyo, Japan, a corporation of Japan No Drawing. Filed Oct. 17, 1966, Ser. No. 586,987

9 Claims. (Cl. 29—604)

ABSTRACT OF THE DISCLOSURE

Thin magnetic memory elements are made in the form of a conductive wire comprising a conductive non-magnetizable base and a thin covering of magnetic material. The method of the present invention is to produce a composite slug of ductile metals with conductive non-magnetic metal covered by a magnetic material. The slug is then drawn in wire-making machinery to produce a wire useful as a magnetic memory element. The product produced by this method is a wire consisting of a non-magnetizable metal base and a covering magnetic material, in which the base is a ductile metal having a Vickers hardness in the range of 60–200.

The present invention relates to a process for producing thin film magnetic memory elements and the elements produced thereby.

Thin film magnetic memory elements are frequently utilized in electronic computers and electronic telephone switchings systems as memory or logical elements. For example, the so-called "wire memory" consists of an array (a matrix) of thin film magnetic wires. Wire memories are often used as the semi-permanent memory or logic in electronic computers and telephone switching systems. Each wire consists of a thin magnetic film or layer which is deposited around an electrical conductor.

These wire memory elements may be produced in various ways. A thin magnetic film may be formed around a conductor by either a spattering method or by vacuum-vapor-condensation or by an electrodeposition method.

A major disadvantage of the spattering method is its very slow working speed, which makes it difficult to use in production. The vacuum-vapour-condensation process has a better production speed than the spattering method. However, a major disadvantage of the vacuum condensation process is that a narrow angle of deposition i.e., the angle of the projection of depositing material (usually not more than several degrees) must be selected to avoid the fluctuation of the anisotropic axis caused by oblique incidences of the deposited material. Therefore the effective area of condensation is limited. After each operation of vapour condensation it is necessary that the apparatus be ventilated. Consequently the cost of production is relatively high.

The electrodeposition method is well adapted for mass production. However, the base upon which the electrostatic method is performed is extremely complicated to manufacture and depends greatly upon the conditions of forming. In addition, electrostatically deposited films have proven unsatisfactory over long periods.

The thin magnetic films obtained in these prior methods have proven to be weak against outer stress. Consequently, the memory elements require very careful attention in their manufacture, installation and use.

Another method which has been used to produce wire memory elements is the so-called "clad-technique." In the clad-technique a metal layer is bonded to the surface of a base metal. This method has also not proven satisfactory in producing wire memory elements. Thin magnetic materials, in general, deteriorate to a great extent in a demagnetizing field. Such a demagnetizing field is produced by the eccentricity and unevenness of the boundary between the base and the clad metal. This unevenness of surface had been considered inevitable in previously used clad-techniques.

It had been believed that the clad-technique could not be utilized in the manufacturing of magnetic wire memory elements as it would produce a wire not having the desired magnetic properties.

A magnetic anisotropy of less than several oersteds is required for the use of thin magnetic film. But the anistropy caused by wire drawing had been thought to be around 200 oersteds.

It is the objective of the present invention to provide a process for the production of magnetic wire memory elements, which process has a high rate of production, is relatively inexpensive and which produces a high quality thin film magnetic memory wire of uniform cross section.

It is a further objective of the present invention to produce a conductive wire plated with a thin film of magnetic material for use in a wire memory, which wire is relatively inexpensive, of uniform cross section, and which performs relatively well under environmental stress and aging.

In accordance with the present invention a magnetic alloy is joined to a drawable base metal. The base metal has a Vickers hardness in the range of 60 to 200 in its annealed condition. The magnetic alloy may be deposited on the base metal by means of vacuum-vapour-condensation, an electrostatic method, or clad to the base by bonding. The magnetic material covers the base metal and the two joined metals are then drawn or rolled into a wire or rolled into a sheet. The wire is used as an element in a wire memory while the sheet is used as the body of a matrix memory.

The present invention will be described below in connection with certain preferred embodiments. However, it is to be understood that the examples given are illustrative of the present invention and do not define its scope.

In the practice of the present invention, a base metal is selected which should be able to be drawn in a wire drawing machine or formed into a wire by a wire rolling process. For the application of the present method, the base metal should have a hardness in the range of 60–200 Vickers hardness.

This range of hardness, i.e., 60–200 Vickers, has been proven by a series of experiments. In the course of these experiments it was shown that, when the Vickers hardness of the base metal is under 60, it was not possible to obtain thin magnetic films with less than 20 uniform thickness and an even composition, in spite of repeated heat annealings and rolling or wire drawings under varied conditions. But when a base metal having a Vickers hardness over 60, and preferably more than 90, was utilized, thin films having an even composition, and with a thickness under 20 $\mu$, were obtained without any difficulty. Using a base metal of over 60 Vickers, it was possible to obtain thin films as thin as 0.2 $\mu$ without difficulty. It was found that when the Vickers hardness of the base metal exceeded 200, the metal was disrupted and could not be successfully drawn into a satisfactory memory element.

It does not matter if the hardness of base metal is more or less than the hardness of the magnetic coating metal. The base metal can be either alloy or a single metal, but it must be characterized by good conductivity and extensibility (ductility), i.e., ability to be drawn or rolled.

The magnetic coating metal which forms the magnetic film may be selected from the metals of the Permalloy group whose composition has been found satisfactory for thin magnetic films and which have some ability to be elongated, i.e., extensibility or ductility. The magnetic metal is deposited to cover the base metal, for example, by using the methods of polymerization or vacuum-vapour condensation or an electrodeposition method. Subsequently the two joined metals are finished by a rolling or a wire-drawing process.

The thickness of the magnetic metal is preferably adjusted when it is deposited on the base metal in accordance with the desired thickness of the final magnetic film. The compound rod or plate comprising the base metal and the magnetic metal is worked by rolling and wire-drawing processes. The wire undergoes intermediate annealing and is finished so that the cross-sectional area of the film is diminished to less than 20% of its area prior to the wire-drawing or rolling process.

In the process of the present invention, a thin magnetic film with a thickness of less than 20 μ and an even composition is obtained with the film having a firm bond to the base metal. When the cross-sectional area of the magnetic film is more than 20% of its original cross-sectional area, considerable fluctuations of magnetic anisotropy may occur. An even greater magnetic anisotropy may be attained by applying the wire-drawing or rolling processes repeatedly.

The present invention will now be more specifically described by reference to the following examples:

Example 1

A Permalloy alloy composed of 81% by weight of nickel and 19% by weight of iron was coated over the surface of a conductive non-magnetizable Phosphor bronze rod of 10 cm. length and 10 mm. diameter. Permalloy alloys are characterized by high magnetic permeability at low field strength and low hysteresis loss. The coating was accomplished by an electrodeposition method to form a Permalloy film 0.02 mm. thick. The coated rod was kept for an hour at 400° C. for stabilization and for obtaining a uniform composition of the electrically deposited film. The rod was then wire-drawn to produce a Permalloy clad wire of about 1,000 meters long and 0.1 mm. in diameter. The thickness of Permalloy over the entire length of the clad wire was 0.25 μ. Its anisotropy was in its drawn direction and its squareness ratio was $Br/B_{10}>98\%$. Its coercive force was 3.5 oe.±0.1 oe. and its tensile strength was 80 Km./mm.$^2$. The residual induction $B_{10}$ represented here was taken at the external field of 10 oe.

The Permalloy-clad wire with these characteristics was employed as word line (series of bits) memory element in a semi-permanent memory unit. It was excited by means of a driving pulse having a rise time of 25 nano-seconds, a pulse width of 0.1 μ secs., and an amplitude of 500 ma. An output having a switching time of 30 nano-seconds and a voltage about 2 mv. was obtained on the reading line. The output consisted of opposite signals in accordance with the direction that the storage magnets were magnetized.

Example 2

A phosphor bronze rod of 10 mm. diameter and 10 cm. long was thrust and press-fitted into a pipe of magnetic Permalloy material. The composition of the Permalloy was 81% by weight of nickel, 18.8% by weight of iron and 0.2% by weight of manganese. The pipe was 10 cm. long, of 10 mm. diameter and had a 0.2 mm. wall thickness. A wire-drawing process was applied to the joined rod and pipe. It produced a Permalloy clad wire 1,000 meters long and 0.1 mm. in diameter. The thickness of the Permalloy of the wire was 3 μ. Its anisotropy was in the drawn direction and its squareness ratio was $Br/B_{10}>97\%$, its coercive force was 3.3 oe.±0.2 oe., and its tensile strength was 85 kg./mm.$^2$. The Permalloy clad wire thus produced was tested as a word line in a semi-permanent memory unit. It was magnetized by means of a driving pulse having rise time of 50 nano-seconds, a pulse width of 0.2 μ secs., and an amplitude of 500 ma. An output was obtained having a switching time of about 70 nano-seconds. A voltage of about 10 mv. was obtained on the sense line.

Example 3

A rod consisting of a tube made of Permalloy and an internal phosphor bronze rod, as described in the Example 2 was drawn until the diameter became as thin as 6 mm. Intermediate heat annealing was applied to the wire for an hour at 650° C. The wire was then further drawn until it obtained a diameter of 3 mm. Intermediate annealing was again applied for an hour at 650° C. The wire was drawn once more until the diameter got to 0.1 mm. A Permalloy wire having a length of 1,000 meters was obtained.

The Permalloy coating of the Permalloy clad wire produced in this Example 3 had a thickness of 2.5 μ. Its coercive force was 3.0 oe.±0.1 oe., its anisotropy was in the drawn direction and its squareness ratio was $Br/B_{10}>97\%$, and it had a tensile strength 80 kg./mm.$^2$. The microscopic picture attached to the specification (×670) shows the cross section area of the Permalloy clad wire produced in the above-described Example 3. The Permalloy film was formed around the wire core of phosphor bronze in a concentric form and almost no eccentricity was observed. The utmost exterior layer shown in the microscopic picture is a copper plating specially applied for taking a clear picture and is not present in the ordinary memory wire.

The Permalloy clad wire produced by the Example 3 was utilized as a word line in a semi-permanent memory unit. It was magnetized, as in prior examples, by means of a driving pulse with rise time of 50 nano-seconds, a pulse width of 0.2 μ sec., and an amplitude of 500 ma. The output of a switching time of 70 nano-seconds and a voltage of about 10 mv. was observed on the reading line.

Example 4

A layer of Permalloy composed of 82% by weight nickel and 18% by weight iron was deposited with a thickness of 0.02 mm., using an electrodeposition method, on a phosphor bronze plate having an area of 10 x 10 mm. and being 10 mm. thick. After being heated for an hour (for stabilization) at 400° C., the plate was rolled and extended. Intermediate annealings were applied until the plate obtained a thickness of 0.1 mm. A Permalloy clad plate of 11 cm. width and 8.5 meter of length was obtained. The thickness of the Permalloy coating deposited on the Permalloy clad plate was 0.25 μ, its coercive force was 3.8 oe.±0.1 oe., its anisotropy was in the rolled direction and its squareness ratio was $Br/B_{10}>95\%$, and its tensile strength was 75 kg./mm$^2$.

1.5 mm. square islands were made on the Permalloy surface of the Permalloy clad plate in the form of a matrix by photo-etching. The islands were at a distance of 1.5 mm. from each other. This plate was employed as a memory plate in a semi-permanent memory unit. It provided an output of switching time of about 30 nano-seconds. A voltage about 5 mv. appeared on the reading line, when the word line was magnetized with a pulse having a rise time of 25 nano-seconds, a pulse width of 0.1 μ secs., and an amplitude of 500 ma.

In the above-described examples phosphor bronze was employed as the base metal and Permalloy as the magnetic metal. But other materials may be used for base metals. Such alloys include: alloys of Ag=Cu group, alloys of Ag—Ni—Cu group, alloys of Cd—Cu group, alloys of Cu=Sn=Zn group, and alloys of Cu—Sn—Zn—P group. Suitable magnetic alloys include the Co—Ni group, alloys of the Cu—Fe—Ni group, magnetic materials as alloys of Cu—Fe—Co group, Permalloy containing 35–55% of Ni, and non-linear magnetic material that contains 75–85% of Ni.

In cases where these metals satisfy the above-described conditions and requirements, the method of the present invention may be applied and the same results and functions are obtained. Therefore, examples with such materials are omitted in the specification.

When Permalloy is employed as magnetic material, it must be annealed at a temperature of 400 to 1050° C. after the rolling and wire-drawing processes. When the annealing temperature is under 400° C., the constant of uniaxial anisotropy is increased so that a sufficient value ($3 \times 10^3$ erg./cm.$^3$) for its operation as magnetic element cannot be achieved. If the annealing temperature exceeds 1050° C., there is a danger of melting the base metal and diffusing the coating. This annealing treatment is not necessary when some other magnetic materials are employed as the magnetic film layer.

According to the present invention, magnetic metal covers the base metal and the covered metal is thereafter rolled or wire-drawn. The vapour condensation process or an electrodeposition process takes considerable time to cover the base metal. However, it is an advantage of the present invention that such deposition or plating time is not significant in the overall production process. For example, a rod of 10 cm. in length and 1 cm. in diameter may be extended to 1,000 meters of Permalloy clad wire by wire-drawing; that is, it is extended to 10,000 times the length of the original rod. Thus, there is no problem even if it takes some time for the vacuum-vapour condensation or electrodeposition process of deposition or plating on the base metal.

Another advantage of the present invention is that, even if there is some unevenness in the coating of magnetic metal at the beginning of the process, such uneven parts can be removed or made even in the course of rolling or wire-drawing. In addition, a proper size of the material and other conditions for finishing may be selected so that the thickness of the magnetic film can be fixed at will.

Modifications may be made in the present invention within the scope of the sub-joined claims.

What is claimed is:

1. The process of producing a magnetic memory array comprising the steps of selecting a ductile conductive non-magnetizable metal base having a Vickers hardness in the range of 60–200, covering said base with a layer of ductile magnetic material to form a covered base, elongating said covered base by wire drawing machines to the form of a wire until the cross-sectional area of said magnetic material is no more than 20% of the original cross-sectional area of said magnetic material, cutting the wire and crossing the cut wires to form a magnetic memory array with conductive non-magnetic wires.

2. The process of producing a magnetic memory array comprising the steps of selecting a ductile non-magnetizable conductive metal base in the form of a sheet, said base having a Vickers hardness in the range of 60–200, covering said base with a coating of ductile magnetic material to form a coated base, and elongating said coated base by pressure means to form a thin sheet until the cross-sectional area of said magnetic material is no more than 20% of the original cross-sectional area of said magnetic material, and then forming a magnetic matrix by removal of areas of the said magnetic material from the said base.

3. The process of claim 1 and including the step of annealing said coated base after elongation.

4. The process of claim 1 wherein partial elongation is followed by heat treatment, which is followed by further elongation.

5. The process of claim 1 wherein the magnetic material is coated by bonding to form a clad structure with said base prior to said elongation.

6. The process of claim 1 wherein the magnetic materal is in the form of a tube prior to its covering of said base.

7. The process of claim 1 wherein the base comprises substantially alloys of the Ag-Cu group, the Ni-Cu group, the Ag-Ni-Cu group, the Cd-Cu group, the Cu-Sn-Zn group or the Cu-Sn-Zn-P group.

8. The process of claim 1 wherein the magnetic material comprises substantially alloys of the Co-Ni group, the Cu-Fe-Ni group, or the Cu-Fe-Co group.

9. The process of claim 1 wherein the magnetic material consists of Permalloy that contains 35 to 55% of Ni or 75 to 85% of Ni is employed as the magnetic material and after the elongating step said material is annealed at 400° to 1050° C.

References Cited

UNITED STATES PATENTS

| | | | |
|---|---|---|---|
| 1,653,378 | 12/1927 | Steel | 148—11.5 |
| 2,145,248 | 1/1939 | Chace | 29—528 X |
| 2,249,417 | 7/1941 | Chace | 148—34 X |
| 2,365,208 | 12/1944 | Morris | 148—11.5 |
| 2,545,447 | 3/1951 | Harris | 29—528 X |
| 2,676,123 | 4/1954 | Gregory | 148—11.5 |
| 3,297,418 | 1/1967 | Firestone | 29—199 |

HYLAND BIZOT, *Primary Examiner.*